(12) United States Patent
Ludwig et al.

(10) Patent No.: US 8,224,548 B2
(45) Date of Patent: Jul. 17, 2012

(54) STARTING AID

(75) Inventors: Dorothea Ludwig, Darmstadt (DE); Alexander Mann-Wahrenberg, Bischofsheim (DE); Leo Schineller, Wasbüttel (DE)

(73) Assignees: Continental Teves AG & Co, OHG, Frankfurt (DE); Volkswagen AG, Wolfsburg (DE)

( * ) Notice: Subject to any disclaimer, the term of this patent is extended or adjusted under 35 U.S.C. 154(b) by 1055 days.

(21) Appl. No.: 11/793,460

(22) PCT Filed: Dec. 19, 2005

(86) PCT No.: PCT/EP2005/056934
§ 371 (c)(1),
(2), (4) Date: Jun. 27, 2008

(87) PCT Pub. No.: WO2006/067125
PCT Pub. Date: Jun. 29, 2006

(65) Prior Publication Data
US 2008/0262691 A1 Oct. 23, 2008

(30) Foreign Application Priority Data

| Dec. 20, 2004 | (DE) | 10 2004 062 453 |
| Apr. 2, 2005 | (DE) | 10 2005 015 229 |
| Dec. 19, 2005 | (DE) | 10 2005 061 123 |

(51) Int. Cl.
*B60T 7/00* (2006.01)
*G06F 17/00* (2006.01)

(52) U.S. Cl. ............... 701/78; 701/70; 701/79; 701/83; 701/116

(58) Field of Classification Search .............. 701/78, 701/79, 80, 81, 82, 83, 84, 116, 70
See application file for complete search history.

(56) References Cited

U.S. PATENT DOCUMENTS

| 6,009,984 | A  * | 1/2000 | Zechmann et al. | 188/353 |
| 6,315,372 | B1 * | 11/2001 | Kroger et al. | 303/191 |
| 6,370,466 | B1 * | 4/2002 | Hada et al. | 701/70 |
| 6,439,675 | B1 | 8/2002 | Zechmann et al. | |
| 6,748,311 | B1 * | 6/2004 | Walenty et al. | 701/70 |
| 7,206,682 | B2 * | 4/2007 | Bodin et al. | 701/67 |
| 7,665,808 | B2 * | 2/2010 | Deprez et al. | 303/192 |
| 7,734,403 | B2 * | 6/2010 | Baijens et al. | 701/70 |
| 7,801,656 | B2 * | 9/2010 | Alvarez et al. | 701/70 |
| 8,027,774 | B2 * | 9/2011 | Laiou et al. | 701/70 |

(Continued)

FOREIGN PATENT DOCUMENTS

DE 10151846 5/2002

(Continued)

*Primary Examiner* — Lesley D. Morris
*Assistant Examiner* — Marc Scharich (57) ABSTRACT

Disclosed is a method of preventing a vehicle in a starting maneuver from rolling in a direction opposite a direction selected to move the vehicle during the starting maneuver. A brake force is built up or maintained on at least one wheel brake during standstill of the vehicle. The method is characterized in that a comparison between an engine rotational speed gradient and an engine rotational speed gradient threshold value as well as a comparison between a pedal travel, by which an accelerator pedal of the vehicle is depressed, and a pedal travel threshold value are performed, and in that the brake force at the at least one wheel brake is reduced when it is established that the engine rotational speed gradient exceeds the engine rotational speed gradient threshold value, and/or the pedal travel, by which the accelerator pedal is depressed, exceeds the pedal travel threshold value. Also disclosed a device that is appropriate to implement the method.

14 Claims, 5 Drawing Sheets

U.S. PATENT DOCUMENTS

2010/0138129 A1 * 6/2010 Mallet et al. .................... 701/83

FOREIGN PATENT DOCUMENTS

| | | |
|---|---|---|
| DE | 10065589 | 7/2002 |
| DE | 10240294 | 3/2003 |
| DE | 10200783 | 7/2003 |
| DE | 10306363 | 8/2004 |
| EP | 1410940 | 4/2004 |
| EP | 1442951 | 8/2004 |

* cited by examiner

Fig. 5 ns of a type of vehicle, very different starting performances

STARTING AID

This application is the U.S. national phase of international application PCT/EP05/56934 filed Dec. 19, 2005, which designated the U.S. and which claims the benefit of priority of German Patent Application Number 10 2005 061 123.0 filed Dec. 19, 2005, German Patent Application Number 10 2005 015 229.5 filed Apr. 2, 2005, and German Patent Application Number 10 2004 062 453.4 filed Dec. 20, 2004. The contents of each of the aforementioned documents are incorporated herein in their entirety.

BACKGROUND OF THE INVENTION

The present invention relates to a method of preventing a vehicle in a starting maneuver from rolling in a direction opposite to a direction selected to move the vehicle during the starting maneuver, wherein brake force is built up and/or maintained on at least one wheel brake during standstill of the vehicle.

The invention further relates to a device that is appropriate to implement the method.

Starting maneuver assist systems are known by the name 'hill holder' or the name Hill Start Assist (HSA) that will be used in the following, wherein the driver of a vehicle is assisted in a starting maneuver on a slope by a method of the type initially referred to.

It is usually provided that a service brake system of the vehicle is equipped with an energy supply unit, by means of which a defined brake pressure is automatically built up in one or more wheel brakes of the vehicle, or a brake pressure set by the driver in one or more wheel brakes is maintained in order to keep the vehicle in a standstill position until a starting maneuver of the vehicle is detected. Alternatively, it can be arranged that brake force is generated during standstill by means of an externally controllable parking brake device, which is released during the starting maneuver.

It is decisive in the HSA function that, during the starting maneuver, the brake force is neither reduced too early, whereby the vehicle could roll back, nor too late, with the result that the traction force would be reduced when starting to drive, what the driver perceives as a loss in dynamics.

It is known in this respect to reduce the brake force during a starting maneuver corresponding to a balancing of torques of downhill, brake and engine drive torques that act on a wheel of the vehicle, as has been described in European patent EP 1 023 547 B1. It is necessary, however, to determine the drive torque or the parameters decisive for the control of the brake force reduction by way of an engine model. To this end, engine performance characteristics must be recorded for each engine-gearbox variation of a vehicle, and the parameters must be adapted to the respective engine performance characteristics, for which purpose a repeated test and adaptation is generally required.

This procedure is very time-consuming, which is a major problem in view of the fact that frequently relative short times are only available for the development. In addition, it is customary that the engine performance characteristics are also adapted in the current series, what could cause mistuning of the HSA and necessitate an adaptation of the HSA, respectively.

Further, it has frequently been found in the known procedure that brake force is reduced too early or too late so that the vehicle rolls back in a starting maneuver or the dynamics in starting is impaired. Due to the necessary individual adaptation of the parameters to the various engine-gearbox variations of a type of vehicle, very different starting performances have been encountered in different variations in addition, what is not desirable in a series vehicle.

In view of the above, an object of the invention is to further improve upon a method of the above-mentioned type in such a way that the previously required expenditure in time for the adaptation of a starting aid is reduced. Another objective of the invention relates to disclosing a device that is suitable to implement the method.

SUMMARY OF THE INVENTION

According to the invention, this object is achieved by a method for preventing a vehicle in a starting maneuver from rolling in a direction opposite a direction selected to move the vehicle during the starting maneuver, wherein brake force is built up and/or maintained on at least one wheel brake during standstill of the vehicle. The method includes comparing an engine rotational speed gradient and an engine rotational speed gradient threshold value ($k_1$), and comparing a pedal travel, by which an accelerator pedal (7) of the vehicle is depressed, and a pedal travel threshold value ($k_2$). The brake force at the at least one wheel brake (4) is reduced when it is detected that the engine rotational speed gradient exceeds the engine rotational speed gradient threshold value ($k_1$), and/or the pedal travel, by which the accelerator pedal (7) is depressed, exceeds the pedal travel threshold value ($k_2$).

The object is also achieved by a device for preventing a vehicle in a starting maneuver from rolling in a direction opposite a direction selected to move the vehicle during the starting maneuver. The device includes at least one wheel brake (4) at which a brake force can be set during standstill of the vehicle, a driving engine (6) controllable by an accelerator pedal (7), and at least one comparison device allowing a comparison between an engine rotational speed gradient and an engine rotational speed gradient threshold value ($k_1$) and a comparison between a pedal travel, by which the accelerator pedal (7) is depressed, and a pedal travel threshold value ($k_2$), and the brake force in the at least one wheel brake (4) can be reduced when it is established in the at least one comparison device that the engine rotational speed gradient exceeds the engine rotational speed gradient threshold value ($k_1$), and/or the pedal travel, by which the accelerator pedal (7) is depressed, exceeds the pedal travel threshold value ($k_2$).

According to the invention, a method of the type referred to hereinabove is implemented in such a fashion that a comparison between an engine rotational speed gradient and an engine rotational speed gradient threshold value as well as a comparison between a pedal travel, by which an accelerator pedal of the vehicle is depressed, and a pedal travel threshold value are performed, and that the brake force at the wheel brake is reduced when it is detected that the engine rotational speed gradient exceeds the engine rotational speed gradient threshold value, and/or the pedal travel, by which the accelerator pedal is depressed, exceeds the pedal travel threshold value.

Another subject matter of the invention is directed to a device for preventing a vehicle in a starting maneuver from rolling in a direction opposite to a direction selected to move the vehicle during the starting maneuver, comprising at least one wheel brake at which a brake force can be set during standstill of the vehicle, a driving engine controllable by an accelerator pedal, and at least one comparison means allowing a comparison between an engine rotational speed gradient and an engine rotational speed gradient threshold value and a comparison between a pedal travel, by which the accelerator pedal is depressed, and a pedal travel threshold value, and the brake force in the at least one wheel brake can be reduced when it is established in the at least one comparison means that the engine rotational speed gradient exceeds the engine rotational speed gradient threshold value, and/or the pedal travel, by which the accelerator pedal is depressed, exceeds the pedal travel threshold value.

The invention is equally applicable for use in any engine-gearbox variations of a type of vehicle and can be adapted to different types of vehicle in a very simple manner. The invention is based on the empirical reflection that basically, irrespective of the driving engine employed and the gearbox used, a sufficient rate of drive torque is available to prevent the vehicle from rolling in a direction opposite to the direction of starting when the engine rotational speed gradient, i.e. the rate of change of the rotational speed of the driving engine, exceeds an engine rotational speed gradient threshold value, and/or when the pedal travel, by which the accelerator pedal of the vehicle is depressed, exceeds a pedal travel threshold value.

Thus, the method of the invention and the device of the invention can be used in different engine-gearbox variations of a type of vehicle and in different types of vehicles without extensive and time-consuming adaptation work. It has shown in this respect that the application of the invention leads to a comparable starting performance in different engine-gearbox variations. The consequence is a considerable reduction of the time needed in applying an HSA system especially in vehicles with a great variety of engine-gearbox variations. Besides, the engine rotational speed gradient threshold value and/or the pedal travel threshold value can be changed in a simple fashion to comply with the requests of the vehicle original equipment manufacturer in order to achieve an earlier or later release of the brake, without impairing the robustness of the HSA system.

Hence, the invention permits a significant reduction of the time of development and a related reduction of the development costs incurred in the application of an HSA system. The expenditure in application in an average vehicle of the compact-size category with a large number of engine-gearbox variations could be reduced to roughly 10% to 20% of the expenditure, which would be incurred in the procedure according to the state of the art. It has been found at the same time that the reliability of an HSA system is further enhanced by the invention because the latter permits a particularly reliable detection of a starting maneuver.

Empirical studies have shown that an especially comfortable starting maneuver is enabled when the engine rotational speed gradient threshold value is higher than $1000 \ s^{-2}$.

In a particularly favorable embodiment of the method of the invention and the device of the invention, it is provided that the engine rotational speed gradient threshold value amounts to $1500 \ s^{-2}$.

Further, it has shown in empirical studies that an especially comfortable starting maneuver can be rendered possible when the pedal travel threshold value is higher than 20% of the maximum pedal travel.

The term 'maximum pedal travel' refers to the distance which the accelerator pedal can cover starting from a released position until a full-throttle position where the pedal is completely depressed.

A particularly favorable embodiment of the method of the invention and the device of the invention is characterized in that the pedal travel threshold value amounts to 25% of the maximum pedal travel.

As the current gradient has a major influence on the balancing of torques during a starting maneuver, it is furthermore arranged in a suitable embodiment of the method of the invention and the device of the invention that the engine rotational speed gradient threshold value is determined depending on a present longitudinal inclination angle of the vehicle.

The downhill force that acts on the vehicle increases as the longitudinal inclination angle of the vehicle increases, such that larger longitudinal inclination angles necessitate a higher rate of starting torque. In order not to reduce the brake force prematurely in the event of large longitudinal inclination angles, an appropriate embodiment of the method of the invention and the device of the invention is characterized in that the engine rotational speed gradient threshold value increases as the longitudinal inclination angle of the vehicle increases.

In another favorable embodiment of the method of the invention and the device of the invention, the pedal travel threshold value is determined depending on the present longitudinal inclination angle of the vehicle.

As the downhill force increases with the longitudinal inclination angle, it has proved particularly expedient that the pedal travel threshold value increases as the longitudinal inclination angle of the vehicle increases. This will safeguard even with larger longitudinal inclination angles that a sufficient rate of drive torque is available when the brake is released.

In a preferred embodiment of the method of the invention and the device of the invention, it is provided that the brake force at the wheel brake is generated because brake pressure is built up and/or maintained in the at least one wheel brake, and the brake force is reduced in that the brake pressure is reduced with a pressure reduction gradient.

It has been established furthermore that it can be determined during starting by way of the accelerator pedal position whether the driver wishes a quick or a slow starting maneuver. An especially favorable improvement of the method of the invention and the device of the invention is characterized in that the brake pressure reduction gradient is determined depending on the pedal travel, by which the accelerator pedal is depressed.

Usually the driver depresses the accelerator pedal further downwards when a quick start of the vehicle is desired. To take this fact into account, a particularly suitable embodiment of the method of the invention and the device of the invention is characterized in that the brake pressure reduction gradient increases as the pedal travel increases, by which the accelerator pedal is depressed.

In addition, it is arranged in an advantageous improvement of the method of the invention and the device of the invention that the brake pressure reduction gradient is determined depending on the brake pressure in the at least one wheel brake.

To prevent the dynamics of the starting maneuver from being impaired when a high brake pressure occurs in the at least one wheel brake, a suitable embodiment of the method of the invention and the device of the invention is characterized in that the brake pressure reduction gradient increases as the brake pressure that in the wheel brake increases.

Further advantages, special features and suitable improvements of the invention can be seen in the sub claims and the following description of preferred embodiments by way of the Figures.

DETAILED DESCRIPTION OF THE DRAWINGS

Figure 1:
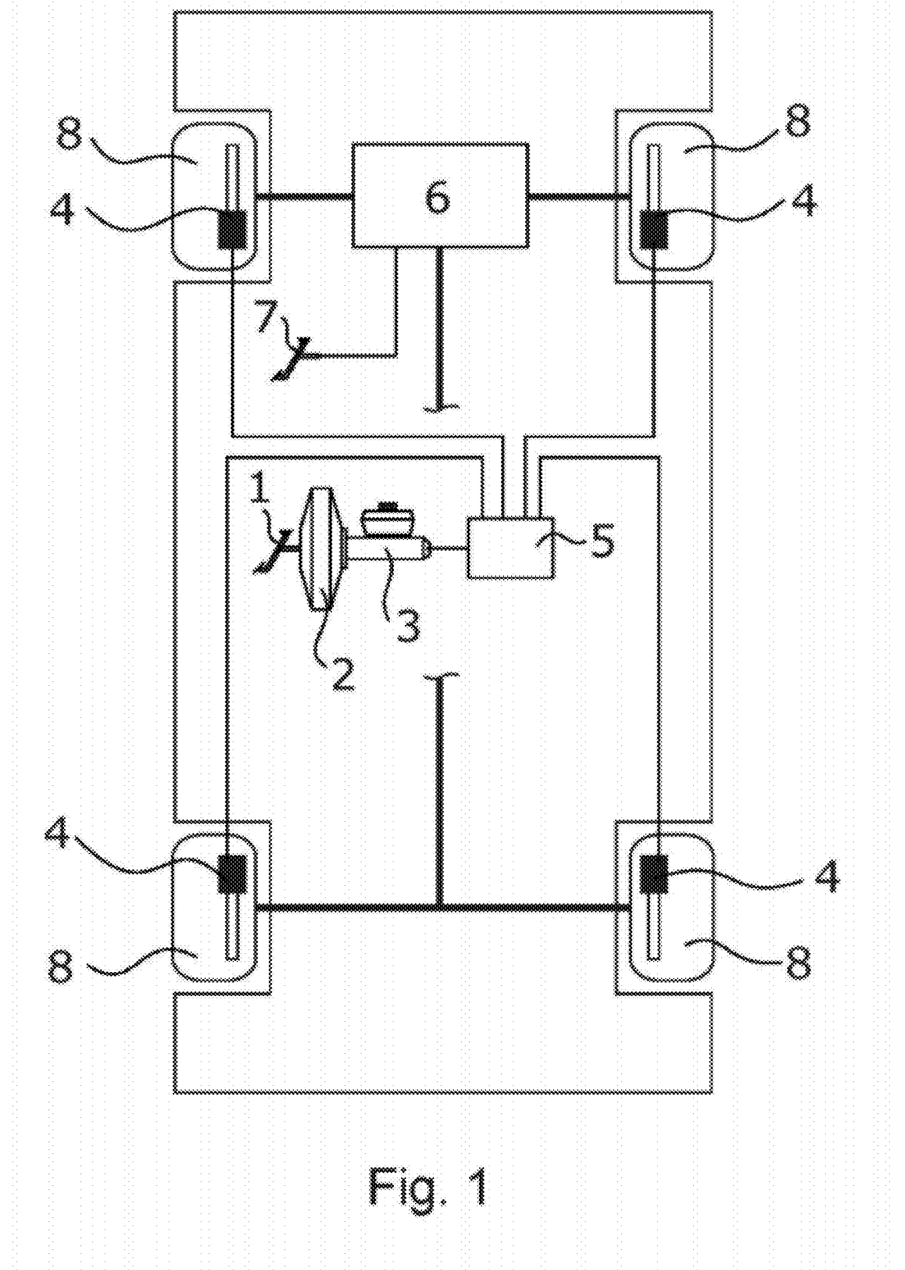
FIG. 1 is a schematic view of a motor vehicle that is appropriate for the implementation of the invention.

FIG. 1 shows a motor vehicle equipped with the basic components for an HSA function. The vehicle includes a service brake system, which is preferably designed as a hydraulic brake system and is operated by the driver by means of an operating device 1, being configured as a brake pedal, for example. The operating device 1 acts through a brake booster 2 on a master brake cylinder 3 in which brake pressure can be generated in a pressure medium and transmitted to the wheel brakes 4. Usually, however, not necessarily, the transmission is through a hydraulic unit 5, which is also employed to implement an electronic stability program (ESP) and is per se known to the expert in the art. The brake pressure that prevails in the wheel brakes 4 will be referred to as $p_{wheel}$ in the following.

Further, the motor vehicle comprises a brake control device, not illustrated in FIG. 1, for the control of one or more energy supply units of the service brake system, by means of which brake pressure $p_{wheel}$ can develop in the wheel brakes 4 in an externally controlled manner. In a preferred way, the brake booster 2 is configured as an active brake booster, which enables producing a brake pressure within the master brake cylinder 3 by corresponding actuation by means of the brake control device, which brake pressure is transmitted to the wheel brakes 4. It may equally be arranged that the wheel brakes are connected to the master brake cylinder 3 by way of an electronically controllable separating valve (not illustrated in the Figure), and the separating valve can be closed by means of the brake control device in order to maintain a brake pressure $p_{wheel}$ that exists in the wheel brakes 4. A separating valve of this type is usually incorporated in the hydraulic unit 5. In order to be able to set a pressure reduction gradient in a targeted manner when the separating valve is being opened, the separating valve is preferably configured as an analog or analogized valve.

Such a service brake system with an externally controllable energy supply unit allows realizing an HSA function in that, during standstill of the motor vehicle, the brake control device sets a brake pressure in the wheel brakes 4, maintaining the motor vehicle at standstill until the brake is released in response to a starting signal or after a predetermined period. It is, however, also feasible in alternative embodiments of the invention that the brake force in the HSA function is generated by means of an electronic parking brake device, not illustrated in FIG. 1, which is controllable by the brake control device. It is preferred though to use an energy supply unit of the service brake system in order to realize the HSA function, wherein the buildup and reduction of brake force can be performed with higher dynamics and at lower noise.

In addition, the motor vehicle has a driving engine 6 that is controlled by the driver using an accelerator pedal 7. At the accelerator pedal 7, a pedal travel sensor (not shown in the Figure) is arranged, allowing measurement of the accelerator pedal position. The measuring signal of this sensor is used especially as an input variable of an engine control device (also not shown), which determines the traction torque requested by the driver depending on the accelerator pedal position, which torque is then generated in the driving engine 6 by corresponding control and is transmitted to the wheels 8 of the motor vehicle.

The HSA function assists the driver in starting maneuvers when driving uphill by using the brake control device to build up and/or maintain brake force at the wheel brakes 4 until a starting signal is detected. When the starting signal appears, the brake force is reduced to zero, with the reduction of the brake force being controlled by the brake control device. This way, the driver can release the brake pedal during a starting maneuver and change over to the accelerator pedal, without the motor vehicle rolling inadvertently during the changeover in a direction that is opposite to a direction that the driver selected to move the vehicle during the starting maneuver.

It shall be assumed in the following that the brake force is generated in the service brake system of the motor vehicle. If so, brake pressure is determined in the brake control device, which is required to hold the motor vehicle in position. After an activation signal has appeared, the brake pressure is then set in at least one of the wheel brakes 4, and the activation signal can be triggered by the driver or automatically, e.g. when it is detected that the driver releases the brake pedal.

Preferably, brake pressure is set by means of the brake control device only when the slope, on which the motor vehicle has been stopped, exceeds a threshold value. To this end, the longitudinal inclination angle of the motor vehicle is determined by means of an inclination angle sensor or by using a longitudinal acceleration sensor, and is compared to the threshold value, which amounts to 2.9° in a favorable embodiment of the invention, which corresponds to a gradient of 5% approximately.

When using a longitudinal acceleration sensor to determine the longitudinal inclination angle, $\sin(\alpha)=-a_{sensor}/g$, applies during standstill of the vehicle, and a designates the longitudinal inclination angle, $a_{sensor}$ implies the longitudinal acceleration measured by the longitudinal acceleration sensor, and g refers to the acceleration due to gravity. The sign has been chosen in such a fashion that a positive longitudinal inclination angle results, when the motor vehicle is positioned in uphill direction.

The reduction of the brake pressure $p_{wheel}$ in the wheel brakes 4 occurs in a favorable embodiment of the invention upon lapse of a predetermined time interval beginning with the activation of the HSA function, the interval preferably having a duration of 1.5 s, and the brake control device is used to open the separating valve in a metered manner or to suitably activate the active brake booster in order to reduce the brake pressure $p_{wheel}$ in the wheel brakes 4.

In addition, the brake pressure $p_{wheel}$ is also reduced when a starting signal is triggered in the brake control device during the predefined time interval.

The starting signal is triggered when the gradient of the driving engine 6 exceeds a predetermined engine rotational speed gradient threshold value $k_1$ and/or when the pedal travel, by which the accelerator pedal 7 is depressed, exceeds a predetermined pedal travel threshold value $k_2$. The engine rotational speed gradient threshold value $k_1$ is higher than 1000 s$^{-2}$ and the pedal travel threshold value $k_2$ is higher than 20% of the maximum pedal travel, by which the accelerator pedal can be depressed from the initial position to the full-throttle position.

In a preferred embodiment of the invention, the engine rotational speed gradient threshold value $k_1$ and the pedal travel threshold value $k_2$ are determined depending on the prevailing gradient or the longitudinal inclination angle of the motor vehicle that is determined in the described fashion. With rising gradient, a higher engine rotational speed gradient threshold value $k_1$ and a higher pedal travel threshold value $k_2$ are required to prevent the vehicle in a starting maneuver from rolling in a direction which is opposite to the selected starting direction, since a higher starting torque must be provided in the presence of steeper gradients in order to make the motor vehicle start off. The pedal travel, by which the accelerator pedal 7 is depressed, is then determined by means of the pedal travel sensor arranged at the accelerator pedal. The engine rotational speed gradient is calculated from the engine rotational speed that is provided by the engine control device.

Figure 2:
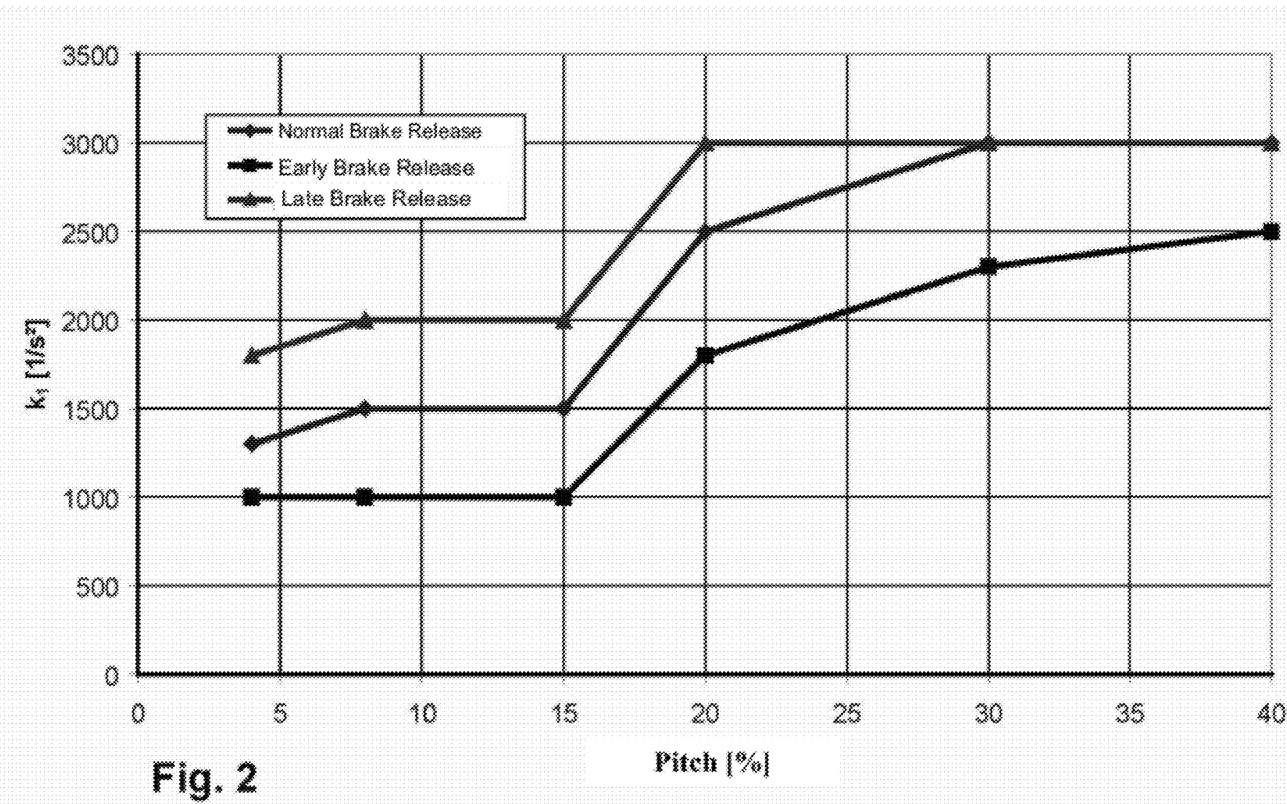
FIG. 2 is a diagram illustrating the dependency of the engine rotational speed gradient threshold value on the present upgrade.

The dependency of the engine rotational speed gradient threshold value $k_1$ on the prevailing gradient is illustrated in FIG. 2 by way of characteristic curves, which can be taken as drafts of traverse from the reference points presented by symbols. It is principally arranged that the engine rotational speed gradient threshold value $k_1$ adopts a first value, when the present gradient is no higher than a predetermined first threshold value. When the present gradient exceeds a second threshold value, the engine rotational speed gradient threshold value $k_1$ will adopt a second value.

Empirical studies have shown that an especially comfortable starting performance of the motor vehicle is achieved, when on gradients between roughly 8% and 15% an engine rotational speed gradient threshold value $k_1$ of 1500 $s^{-2}$ is chosen, as it is depicted by the characteristic curve for a 'normal' release of the brake in FIG. 2. As can be seen in FIG. 2, it has further proved favorable for low gradients between roughly 4% and 8% that the engine rotational speed gradient threshold value $k_1$ rises from 1300 $s^{-2}$ to 1500 $s^{-2}$. In the presence of steeper gradients, the engine rotational speed gradient threshold value $k_1$ will preferably rise from 1500 $s^{-2}$ to a value of 2500 $s^{-2}$, which is reached at a gradient of 20% and further to a value of 3000 $s^{-2}$, which is reached at a gradient of 30%. For gradients in excess of 30%, an engine rotational speed gradient threshold value $k_1$ of 3000 $s^{-2}$ is also chosen in a favorable manner.

Without impairing the robustness of the HSA, the engine rotational speed gradient threshold value $k_1$ may, however, also be chosen in such a way that the brake is released at an earlier or later time during the starting maneuver. In the gradient ranges defined based on the first and the second threshold value, the engine rotational speed gradient threshold values $k_1$ are selected to be lower or higher than the previously illustrated standard values, or they are chosen to be of equal magnitude if an increase or a reduction does not bring about satisfying results.

If late release of the brake is desired, the engine rotational speed gradient threshold value $k_1$ for gradients between 8% and 15% preferably amounts to 2000 $s^{-2}$ and, with gradients in excess of 20%, is preferably increased to 3000 $s^{-2}$. For gradients between 15% and 20%, this value rises linearly from 2000 $s^{-2}$ to 3000 $s^{-2}$. Further, it is provided that the engine rotational speed gradient threshold value $k_1$ for gradients between 4% and 8% rises from 1800 $s^{-2}$ to 2000 $s^{-2}$. To carry out early release of the brake in a starting maneuver, an engine rotational speed gradient threshold value $k_1$ of 1000 $s^{-2}$ has proved favorable for gradients between 4% and 15%. With gradients between 15% and 20%, the engine rotational speed gradient threshold value preferably rises from 1000 $s^{-2}$ to 1800 $s^{-2}$. For steeper gradients, a rise of the engine rotational speed gradient threshold value $k_1$ to 2300 $s^{-2}$ at 30% and an additional increase to a value of 2500 $s^{-2}$, which is reached at 40% gradient, has also proved especially favorable. The corresponding characteristic curves are also shown in the diagram of FIG. 2.

The characteristic curves which is used, is defined preferably in the original equipment of the motor vehicle in conformity with the desires of the vehicle manufacturer. It is, however, principally also possible that all characteristic curves are saved in the brake control device and the driver selects one of the characteristic curves corresponding to his requirements.

Figure 3:
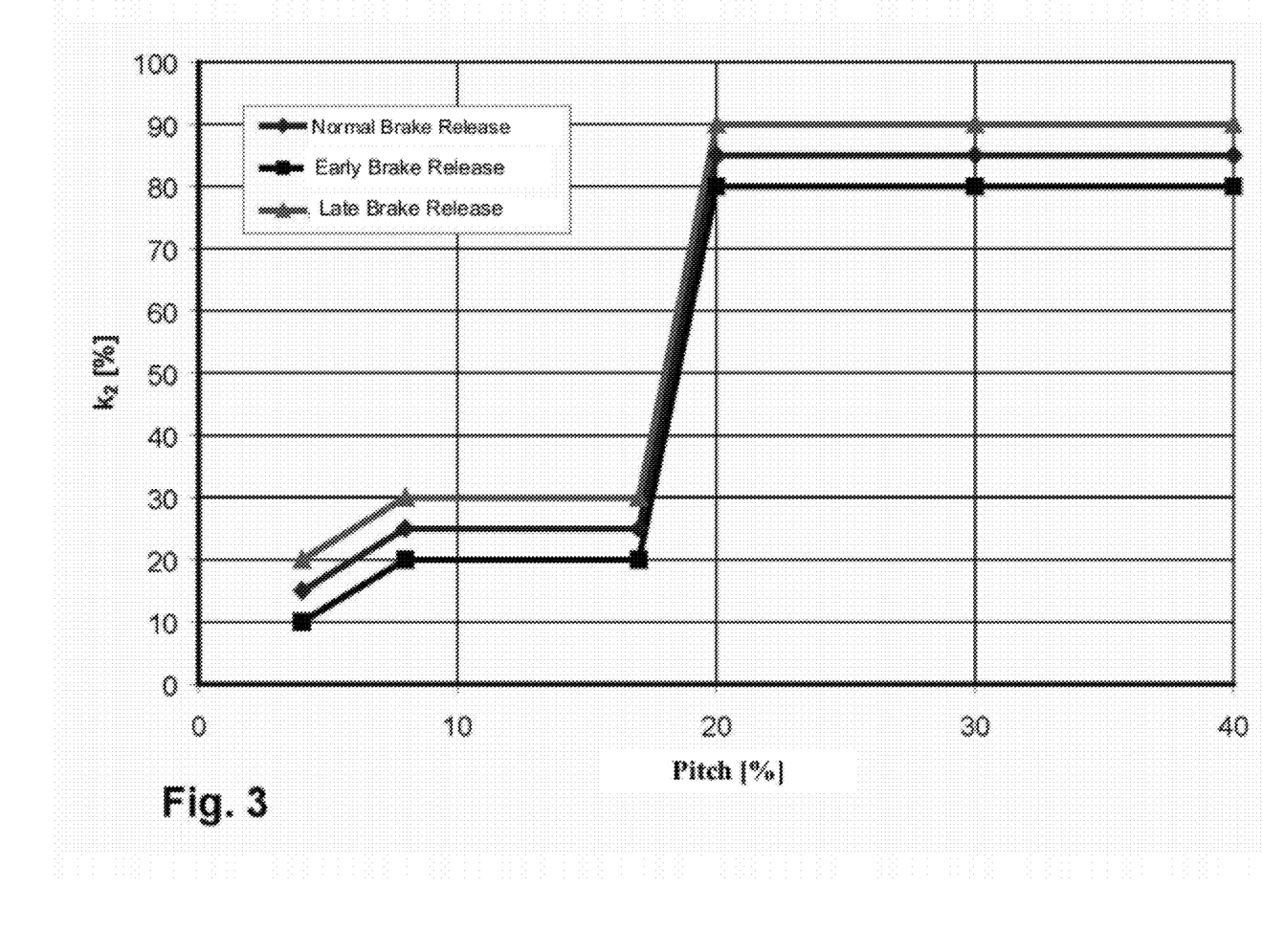
FIG. 3 is a diagram illustrating the dependency of the pedal travel threshold value on the present slope.

The pedal travel threshold value $k_2$ is adapted to the present gradient in a similar way as the engine rotational speed gradient threshold value $k_1$. The dependency of the pedal travel threshold value $k_2$ on the gradient is illustrated in FIG. 3 by way of characteristic curves, which are also drafts of traverse being defined by way of the reference points illustrated in FIG. 3.

Likewise the pedal travel threshold value $k_2$ adopts a first value when the present gradient is lower than a predetermined first threshold value, and is increased to a second value when the gradient exceeds a second threshold value. The two threshold values for the gradient preferably correspond basically to the threshold values which have been described previously with regard to the engine rotational speed gradient threshold value $k_1$.

Extensive tests had as a result that the motor vehicle can be started to drive in a particularly comfortable manner when at gradients between roughly 8% and 17% a standard value $k_2$ of 25% of the maximum pedal travel is chosen, and a standard value of 85% of the maximum pedal travel is chosen for the pedal travel threshold value $k_2$ for gradients exceeding roughly 20%. For gradients between 4% and 8%, the pedal travel maximum value $k_2$ with the present gradient rises preferably from 15% to 25% of the maximum pedal travel. This is shown in FIG. 3 by way of the characteristic curve for a 'normal' release of the brake.

It is equally possible to perform an earlier or later release of the brake during a starting maneuver by reducing or increasing the pedal travel threshold values $k_2$. When later release of the brake is desired, a pedal travel threshold value $k_2$ of 30% of the maximum pedal travel has been proved especially advantageous for gradients between roughly 8% and 17% and a pedal travel threshold value $k_2$ of 90% of the maximum pedal travel for gradients in excess of 20%. With gradients between 4% and 8%, the pedal travel threshold value $k_2$ rises from 20% to 30% of the maximum pedal travel in order to reach late release of the brake. Early release of the brake in a starting maneuver can preferably be reached when for gradients between 8% and 17% a pedal travel threshold value $k_2$ of 20% of the maximum pedal travel and for gradients in excess of 20% a pedal travel threshold value $k_2$ of 80% of the maximum pedal travel is chosen. With gradients between 4% and 8%, a rise of the pedal travel threshold value $k_2$ from 10% to 20% of the maximum pedal travel has proved especially favorable in order to ensure an early release of the brake.

The characteristic curves which is used, is defined also in this case preferably in the original equipment of the motor vehicle in conformity with the desires of the vehicle manufacturer. It is, however, principally also possible that all characteristic curves are saved in the brake control device and the driver selects one of the characteristic curves corresponding to his requirements.

In addition, those characteristic curves that correspond to one another are used to determine the engine rotational speed gradient threshold value $k_1$ and the pedal travel threshold value $k_2$. That means, for example, that that characteristic curve is selected both for the engine rotational speed gradient threshold value $k_1$ and for the pedal travel threshold value $k_2$, which indicates the standard values when 'normal' release of the brake is desired.

In order to render the staring maneuver especially comfortable for the driver, the pressure reduction gradient $dp_{wheel}/dt$ set by the brake control device during the reduction of the brake pressure $p_{wheel}$ is adapted to the accelerator pedal position chosen by the driver to start off and to the brake pressure $p_{wheel}$ prevailing during standstill of the motor vehicle. It is principally arranged in this case that the pressure reduction gradient $dp_{wheel}/dt$ is set the higher, the further downwards the accelerator pedal is depressed and the higher the prevailing brake pressure $p_{wheel}$ is.

Figure 4:
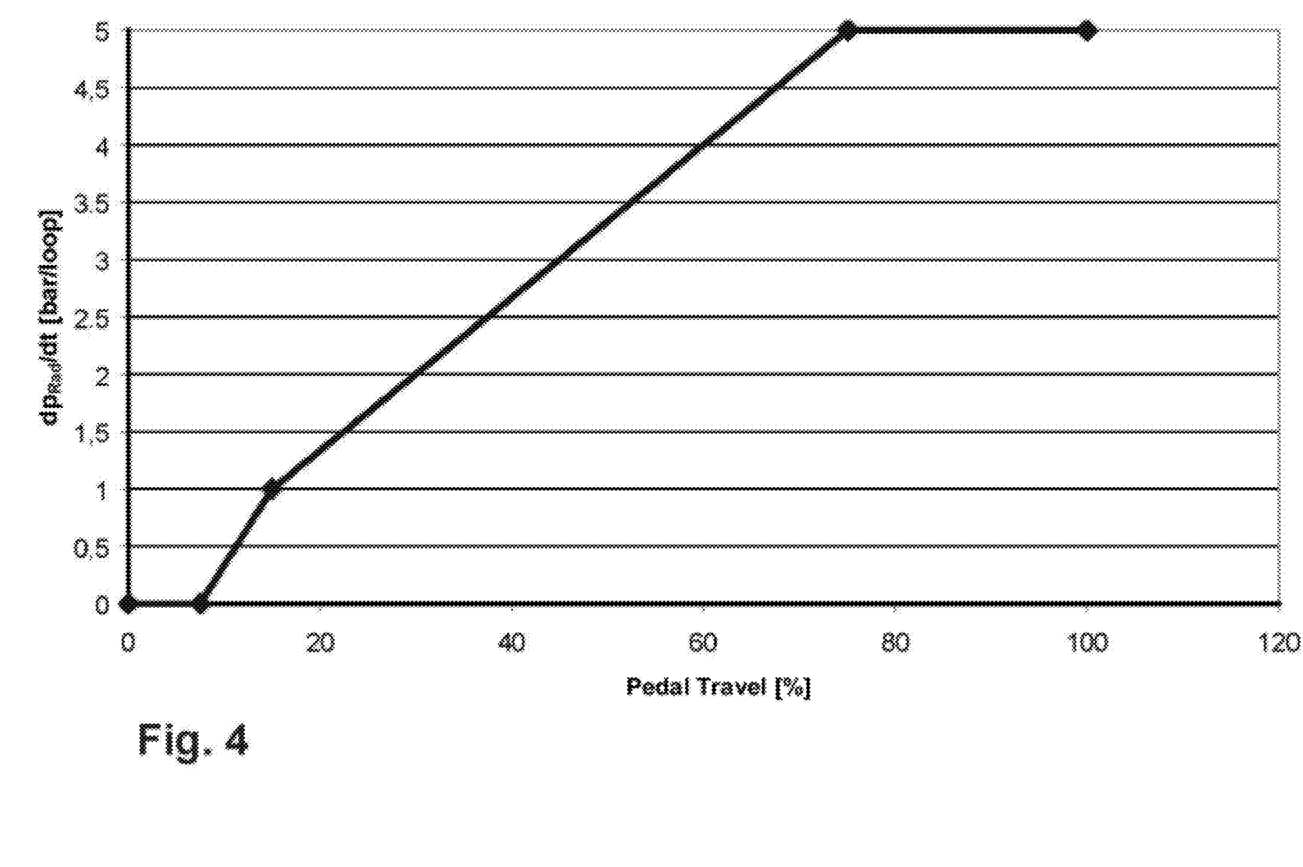
FIG. 4 shows a characteristic curve for the adaptation of the pressure reduction gradient to the pedal travel, by which the accelerator pedal is depressed during starting.

The dependency of the pressure reduction gradient $dp_{wheel}/dt$ on the accelerator pedal position is illustrated by way of the diagram shown in FIG. 4. On the horizontal axis, the pedal travel is plotted in % of the maximum pedal travel, and on the vertical axis the magnitude of the negative pressure reduction gradient $dp_{wheel}/dt$ is plotted in terms of bar/loop, with the term 'loop' referring to the duration of a clock step of the clocked operation of the brake control device, which usually amounts to roughly 10 ms.

As can be seen in the diagram in FIG. 4, pressure reduction in the wheel brakes takes place when the pedal travel, by which the accelerator pedal is depressed, exceeds a predetermined value, which preferably amounts to 7.5% of the pedal travel until the full-throttle position, and the starting signal is triggered depending on the result of the comparison between the engine rotational speed gradient and the engine rotational speed gradient threshold value, when the pedal travel, by which the accelerator pedal is depressed, is inferior to the pedal travel threshold value. When the pedal travel, by which the accelerator pedal is depressed, exceeds the predetermined value, the set value of the pressure reduction gradient $dp_{wheel}/dt$, as shown in FIG. 4, will rise in terms of amount until a value of preferably 5 bar/loop, which is preferably reached when the accelerator pedNo kiddal is depressed by roughly 75% of the maximum pedal travel. A value of 5 bar/loop is likewise chosen for larger pedal travels.

The request of the driver regarding a swift start off of the vehicle is this way complied with, the request being generally implied when the driver depresses the accelerator pedal to an increased extent.

The value of the pressure reduction gradient $dp_{wheel}/dt$, which has been determined by way of the accelerator pedal position in the manner described hereinabove, is weighted with a factor or amplified, respectively, preferably depending on the brake pressure $p_{wheel}$ that prevails in the wheel brakes 4 during standstill, i.e. at the commencement of pressure reduction. The amplification factor is determined by means of a characteristic curve as a function of the brake pressure $p_{wheel}$ prevailing in the service brake system, with the characteristic curve being shown in the diagram in FIG. 5. Again, the characteristic curve is a draft of traverse that is defined by way of the illustrated reference points.

Figure 5:
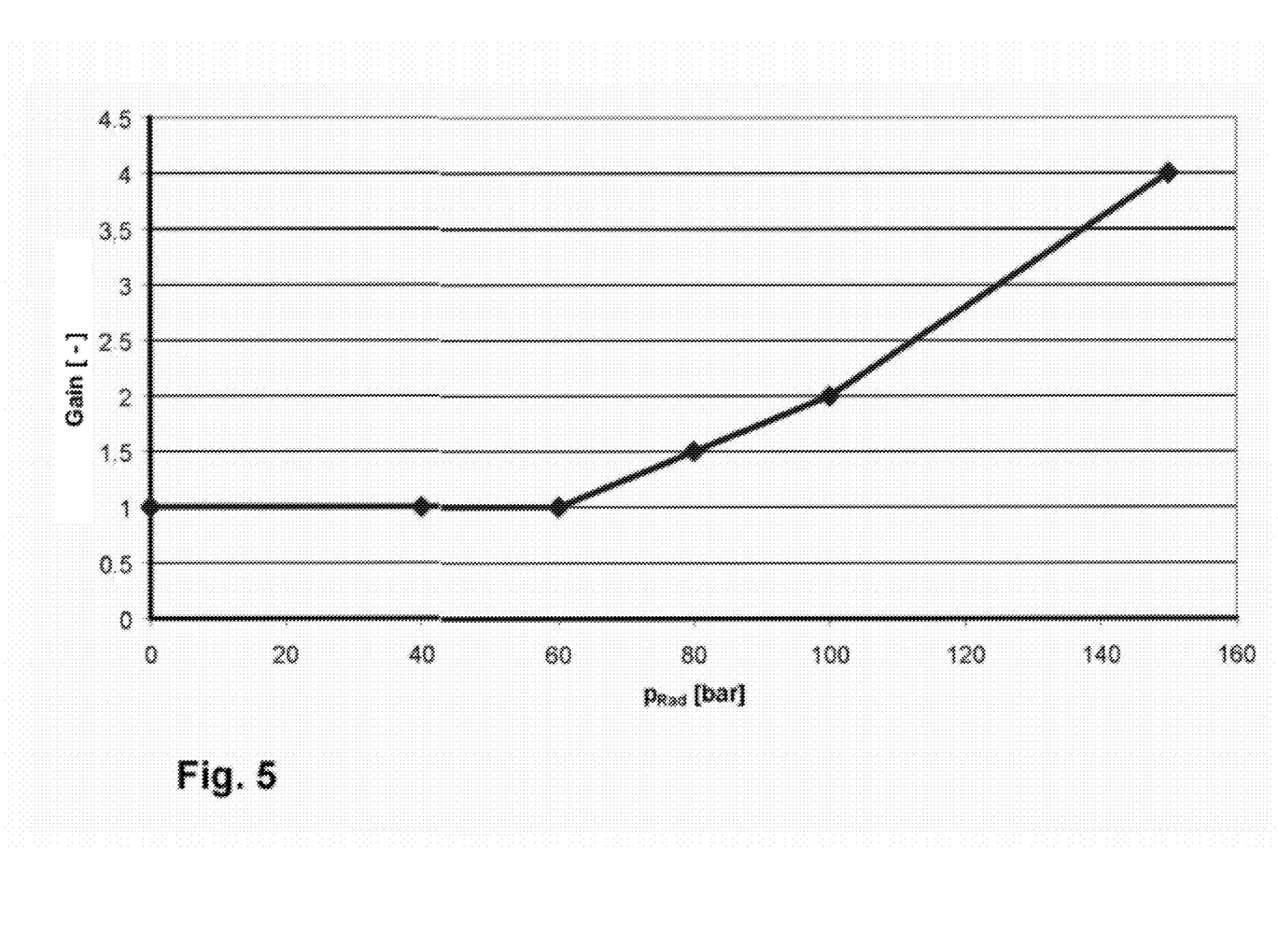
FIG. 5 shows a characteristic curve for the adaptation of the pressure reduction gradient to the brake pressure prevailing at the commencement of the starting maneuver.

As becomes obvious from the diagram in FIG. 5, the amplification factor assumes the value 1 when brake pressures $p_{wheel}$ occur that are no higher than a predetermined value of preferably roughly 60 bar so that the pressure reduction gradient $dp_{wheel}/dt$ that has been determined depending on the accelerator pedal position is set without modifications. In the presence of higher brake pressures $p_{wheel}$ in the service brake system, it is preferred that the value of the amplification factors rises with the brake pressure $p_{wheel}$ until a value of preferably 4, which is reached at roughly 150 bar in a favorable embodiment of the invention.

Thus, a pressure reduction gradient $dp_{wheel}/dt$ of $-10$ bar/loop is set, for example, when a starting signal is triggered, while the driver has depressed the accelerator pedal by more than 75% of the maximum pedal travel and a brake pressure $p_{wheel}$ of 100 bar is set in the service brake system, i.e. an amplification factor of 2 is determined.

The embodiment of the HSA function of the invention, which has been illustrated exemplarily, allows applying the function in a particularly simple manner in different types of vehicles, since the conditions for triggering a starting signal as described can be employed equally in different types of vehicles. This leads to a considerable reduction of the expenditure of development because the adaptation of the HSA function to a specific type of vehicle can be carried out in a simple and quick fashion.

As has been found out in empirical studies, the same conditions lead to a very similar starting performance with different engine-gearbox variations of a type of vehicle, thereby obviating the need for an adaptation of the HSA function to the different engine-gearbox variations.

The invention claimed is:

1. A method of preventing a vehicle in a starting maneuver from rolling in a direction opposite a direction selected to move the vehicle during the starting maneuver, the method comprising:
providing a brake force on at least one wheel brake (4) of the vehicle, wherein the brake force is built up or maintained during standstill of the vehicle;
comparing an engine rotational speed gradient and an engine rotational speed gradient threshold value ($k_1$);
comparing a pedal travel, by which an accelerator pedal (7) of the vehicle is depressed, and a pedal travel threshold value ($k_2$);
reducing the brake force at the at least one wheel brake (4) when it is detected that the engine rotational speed gradient exceeds the engine rotational speed gradient threshold value ($k_1$) or the pedal travel exceeds the pedal travel threshold value ($k_2$); and
wherein the engine rotational speed gradient threshold value ($k_1$) is determined depending on a present longitudinal inclination angle ($\alpha$) of the vehicle.

2. The method of claim 1, wherein the engine rotational speed gradient threshold value ($k_1$) is higher than 1000 s$^{-2}$.

3. The method of claim 2, wherein the engine rotational speed gradient threshold value ($k_1$) is approximately 1500 s$^{-2}$.

4. The method of claim 1, wherein the pedal travel threshold value ($k_2$) is higher than 20% of a maximum pedal travel.

5. The method of claim 4, wherein the pedal travel threshold value ($k_2$) is approximately 25% of the maximum pedal travel.

6. The method of claim 1, wherein the engine rotational speed gradient threshold value ($k_1$) increases as the longitudinal inclination angle ($\alpha$) of the vehicle increases.

7. The method of claim 1, wherein the pedal travel threshold value ($k_2$) is determined depending on the longitudinal inclination angle ($\alpha$) of the vehicle.

8. The method of claim 7, wherein the pedal travel threshold value ($k_2$) increases as the longitudinal inclination angle ($\alpha$) of the vehicle increases.

9. A method of preventing a vehicle in a starting maneuver from rolling in a direction opposite a direction selected to move the vehicle during the starting maneuver, the method comprising:
providing a brake force on at least one wheel brake (4) of the vehicle, wherein the brake force is built up or maintained during standstill of the vehicle;

comparing an engine rotational speed gradient and an engine rotational speed gradient threshold value ($k_1$);

comparing a pedal travel, by which an accelerator pedal (7) of the vehicle is depressed, and a pedal travel threshold value ($k_2$);

reducing the brake force at the at least one wheel brake (4) when it is detected that the engine rotational speed gradient exceeds the engine rotational speed gradient threshold value ($k_1$) or the pedal travel exceeds the pedal travel threshold value ($k_2$); and wherein the brake force is reduced such that a brake pressure ($p_{wheel}$) is reduced with a brake pressure reduction gradient ($dp_{wheel}/dt$).

10. The method of claim 9, wherein the brake pressure reduction gradient ($dp_{wheel}/dt$) is determined depending on the pedal travel, by which the accelerator pedal (7) is depressed.

11. The method of claim 10, wherein the brake pressure reduction gradient ($dp_{wheel}/dt$) increases as the pedal travel increases.

12. The method of claim 10, wherein the brake pressure reduction gradient ($dp_{wheel}/dt$) is determined depending on the brake pressure ($p_{wheel}$) of the at least one wheel brake (4).

13. The method of claim 12, wherein the brake pressure reduction gradient ($dp_{wheel}/dt$) increases as the brake pressure ($p_{wheel}$) of the at least one wheel brake increases.

14. A device for preventing a vehicle in a starting maneuver from rolling in a direction opposite a direction selected to move the vehicle during the starting maneuver, the device comprising:

at least one wheel brake (4) at which a brake force can be set during standstill of the vehicle;

a driving engine (6) controllable by an accelerator pedal (7);

at least one comparison device allowing a comparison between an engine rotational speed gradient and an engine rotational speed gradient threshold value ($k_1$) and a comparison between a pedal travel, by which the accelerator pedal (7) is depressed, and a pedal travel threshold value ($k_2$), and the brake force in the at least one wheel brake (4) can be reduced when it is established in the at least one comparison device that the engine rotational speed gradient exceeds the engine rotational speed gradient threshold value ($k_1$), or the pedal travel exceeds the pedal travel threshold value ($k_2$); and a sensor to determine a present longitudinal inclination angle ($\alpha$) of the vehicle, wherein the engine rotational speed gradient threshold value ($k_1$) is determined depending on the present longitudinal inclination angle ($\alpha$) of the vehicle.

* * * * *